United States Patent [19]

Kuramoto et al.

[11] Patent Number: 5,529,505
[45] Date of Patent: Jun. 25, 1996

[54] CLOCK SPRING CONNECTOR

[75] Inventors: Masanori Kuramoto, Furukawa; Hironori Kato, Sendai; Hiroyuki Bannai, Furukawa; Kunihiko Sasaki, Miyagi-ken, all of Japan

[73] Assignee: Alps Electric Co., Ltd., Tokyo, Japan

[21] Appl. No.: 250,207

[22] Filed: May 27, 1994

[30] Foreign Application Priority Data

May 31, 1993 [JP] Japan ................... 5-129340

[51] Int. Cl.$^6$ .................................................. H01R 3/00
[52] U.S. Cl. .................. 439/164; 439/34; 439/15
[58] Field of Search ....................... 439/34, 4, 11, 439/13, 15, 492, 164

[56] References Cited

U.S. PATENT DOCUMENTS

| | | | |
|---|---|---|---|
| 4,875,860 | 10/1989 | Suzuki | 439/15 |
| 5,046,951 | 9/1991 | Suzuki | 439/15 |
| 5,102,061 | 4/1992 | Suzuki et al. | |
| 5,205,754 | 4/1993 | Kuramoto. | |
| 5,277,604 | 11/1994 | Ida et al. | 439/15 |
| 5,286,219 | 2/1994 | Ueno et al. | 439/15 |
| 5,314,344 | 5/1994 | Ida et al. | 439/15 |
| 5,409,389 | 4/1995 | Shibata et al. | 439/15 |

*Primary Examiner*—David L. Pirlot
*Attorney, Agent, or Firm*—Guy W. Shoup; Patrick T. Bever

[57] ABSTRACT

A clock spring connector including a fixed member, a movable member rotatably connected to the fixed member, and a rotary plate fixedly connected to the movable member and rotatably mounted on the fixed member. The movable member includes a ceiling plate and a bottom plate connected together by an outer cylindrical portion, both the ceiling member and the movable member defining central openings. The movable member is received in the central openings such that an annular space is defined between an outer surface of the movable member and the outer cylindrical portion. A flexible cable is accommodated in the annular space and includes a first end and a second end. The first end of the flexible cable is connected to the movable member and to a support section of the rotary plate, the support section being located further from the center of rotation of the movable member than the edges of the central openings of the ceiling and bottom walls. The rotary plate includes a projection which is connectable to the steering wheel at a point which is further from the center of rotation of the movable member than the edges of the central openings of the ceiling and bottom walls, thereby applying a large torque to the movable member through the rotary plate when the steering wheel is rotated by a driver.

9 Claims, 3 Drawing Sheets 0,000,000

CLOCK SPRING CONNECTOR

BACKGROUND OF THE INVENTION

1. Field of the Invention

The present invention relates to a clock spring connector for use as an electric connection means in an air bag system included in a steering unit of an automobile.

2. Description of the prior Art

A clock spring connector comprises a fixed member, a movable member attached rotatively around the fixed member, and a flexible cable accommodated in a space formed between the fixed member and the movable member. When the clock spring connector is included in a steering unit, the fixed member is secured to the steering column portion and the movable member is connected to the steering wheel portion.

FIG. 4 is a cross sectional view showing a conventional example of a clock spring connector of the foregoing type which has been disclosed in U.S. Pat. No. 5,102,061. Referring to FIG. 4, reference numeral 1 represents a fixed member. The fixed member 1 comprises a disc-like bottom plate 2 having a central hole 2a, an outer cylinder portion 3 stood erect around the bottom plate 2, and a disc-like ceiling plate 4 having a central hole 4a and formed integrally with the top end of the outer cylinder portion 3. A movable member 5 having a shaft-insertion port 5a is rotatively mounted on the central portion of the fixed member 1. The movable member 5 is guided by the central holes 2a and 4a respectively formed in the bottom plate 2 and the ceiling plate 4. An annular space formed between the outer surface of the movable member 5 and the outer cylinder portion 3 accommodates a flexible cable 6. Although omitted from illustration, an end of the flexible cable 6 is passed through the outer cylinder portion 3 and protrudes outside of the fixed member 1. On the other hand, another end of the flexible cable 6 is protrudes outside through the top end of the movable member 5.

The thus-constituted clock spring connector is used in such a way that it is mounted on a steering unit of an automobile. At this time, the fixed member 1 is secured to the steering column portion in such a manner that a lead wire protruding from the fixed member 1 is connected to an air bag drive circuit or a horn circuit mounted on the car body portion. Furthermore, a steering shaft is inserted and fixed into the shaft-insertion hole 5a formed in the movable member 5. A lead wire protruding from the movable member 5 is connected to an inflater for the air bag or a horn switch or the like mounted on the steering wheel portion. Therefore, when the steering wheel (the steering shaft) is rotated clockwise or counterclockwise, its rotational force is transmitted to the movable member 5 and thus the movable member 5 is rotated. In accordance with the direction of the rotation of the movable member 5, the flexible cable 6 is wound around the movable member 5 or the same is rewound toward the outer cylinder portion 3. In either case, the electrical connection between the fixed member 1 and the movable member 5 is maintained by the flexible cable 6.

In the foregoing conventional clock spring connector, when the flexible cable 6 is wound or rewound, the two widthwise ends of the flexible cable 6 are, in a radial direction, moved between the bottom plate 2 and the ceiling plate 4 of the fixed member 1. Therefore, the movement of the flexible cable is not inhibited by the rotation of the movable member 5. Therefore, an advantage can be realized in that the flexible cable can smoothly be wound or rewound.

However, the arrangement that the rotational force of the steering wheel is transmitted to the movable member 5 through a joint portion between the steering shaft and the shaft-insertion hole 5a, that is, the arrangement that the force is transmitted at a position near the rotational center of the movable member 5 raises a problem in that the torque of the movable member 5 is reduced and therefore the force for winding or rewinding the flexible cable 6 becomes too weak. As a means for transmitting the rotational force of the steering wheel to the movable member 5, a method has been known in which a projection extending from the top end surface of the movable member 5 is received by a hub hole formed in the steering wheel. Since the foregoing conventional example has the arrangement that the two vertical ends of the movable member 5 are pivotally supported by the bottom plate 2 and the ceiling plate 4 through the central holes 2a and 4a, it is difficult to maintain a space in which the projection extends from the top end surface of the movable member 5. If the projection extends from the top end surface of the movable member 5, the torque of the movable member 5 cannot be enlarged satisfactorily because the distance from the rotational center of the movable member 5 to the projection is shorter than half of the radius of the central hole 4a of the ceiling plate 4.

SUMMARY OF THE INVENTION

The present invention is directed to overcome the foregoing problems, and therefore an object of the invention is to provide a clock spring connector capable of enlarging torque of a movable member and assuredly winding or rewinding a flexible cable.

In order to achieve the foregoing object, according to the present invention, there is provided a clock spring connector comprising: a fixed member formed by integrating, through a cylinder portion, an outer surface of a ceiling plate having a central hole and that of a bottom plate having another central hole; a movable member rotatively received in the central holes formed in the ceiling plate and the bottom plate; and a flexible cable accommodated in a space formed between the fixed member and the movable member, the fixed member being secured to a steering column portion, and the movable member being connected to a steering wheel portion, wherein a rotary plate extending outwards along a surface of the ceiling plate is secured to the movable member, and a joint portion disposed further from a center of rotation of the movable member than the movable member in a radial direction is formed in the rotary plate so that rotational force of the steering wheel is transmitted to the rotary plate through the joint portion.

When the steering wheel is rotated clockwise or counterclockwise, the rotational force is transmitted to the rotary plate through the joint portion and it is further transmitted to a movable member secured to the rotary plate. Since the joint portion is positioned further from the center of rotation of the movable member than the movable member in the radial direction and the force is transmitted between the steering wheel and the rotary plate at a position sufficiently apart from the center of rotation of the movable member, the torque of the movable member can be enlarged and the rotational force of the movable member enables the flexible cable to be assuredly wound or rewound.

Other and further objects, features and advantages of the invention will be appear more fully from the following description.

DESCRIPTION OF THE PREFERRED EMBODIMENTS

An embodiment of the present invention will now be described with reference to the drawings.

Figure 1:
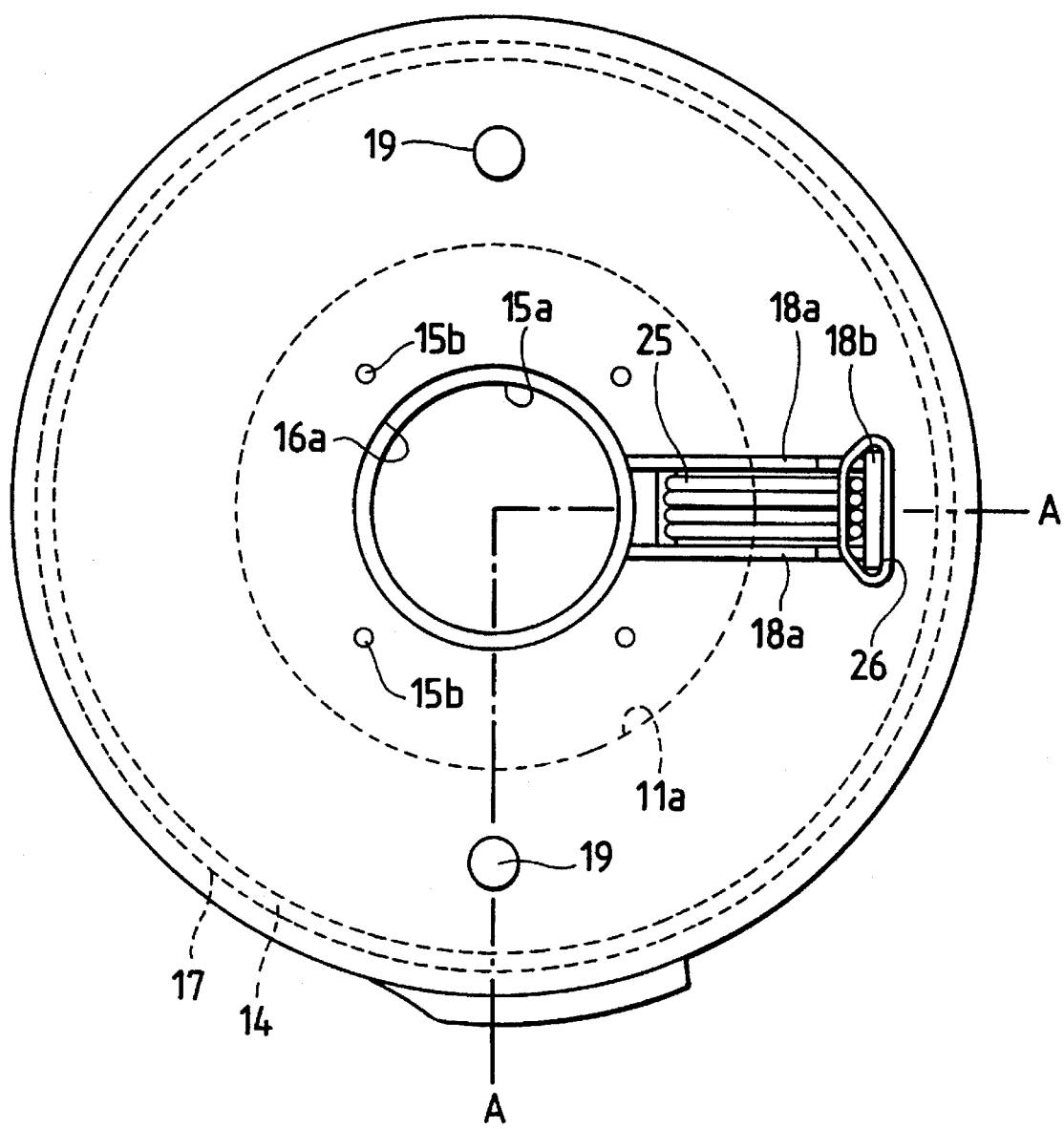
FIG. 1 is a plan view showing a clock spring connector according to an embodiment of the present invention.
Figure 2:
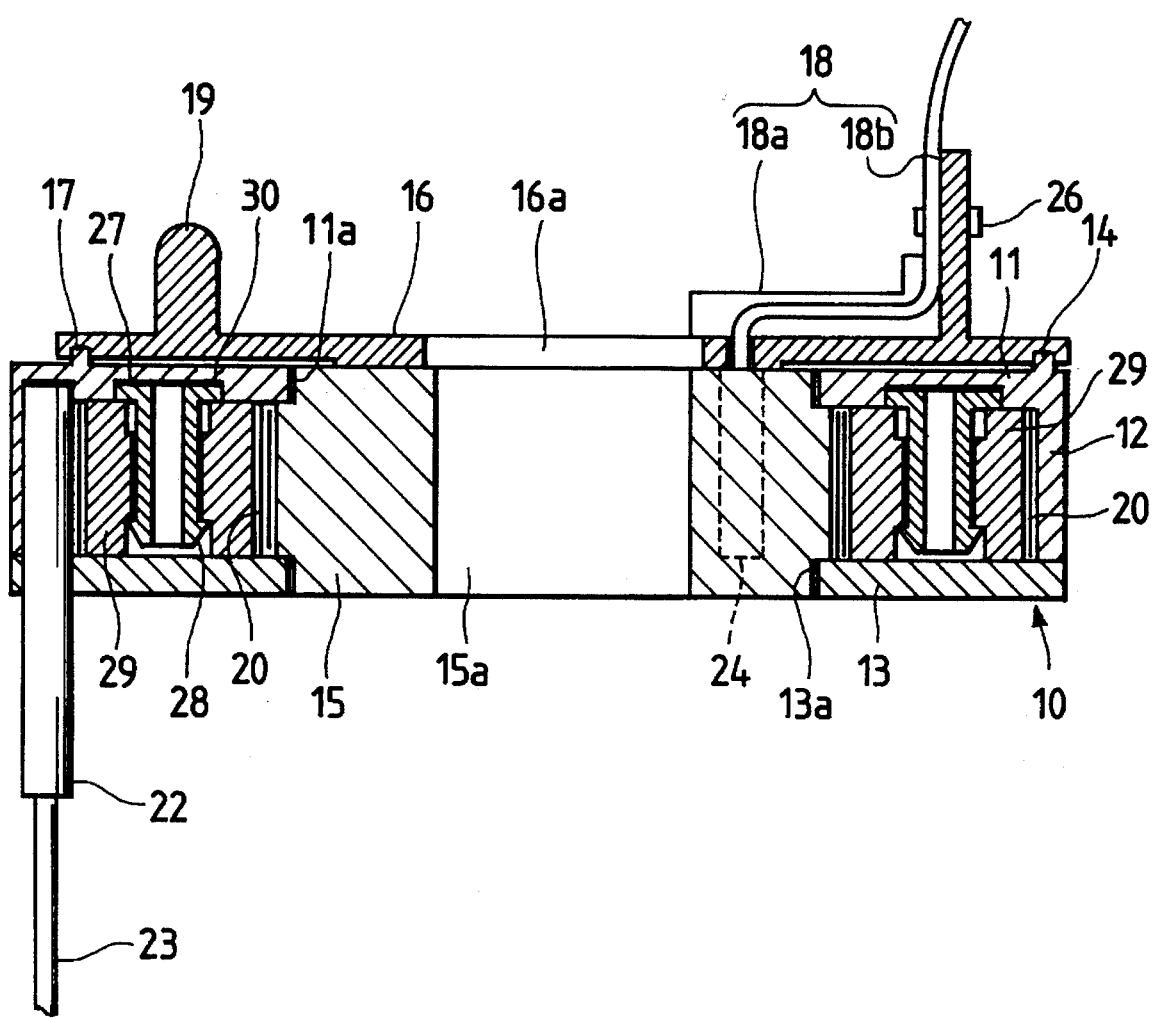
FIG. 2 is a cross sectional view taken along line A—A of FIG. 1.
Figure 3:
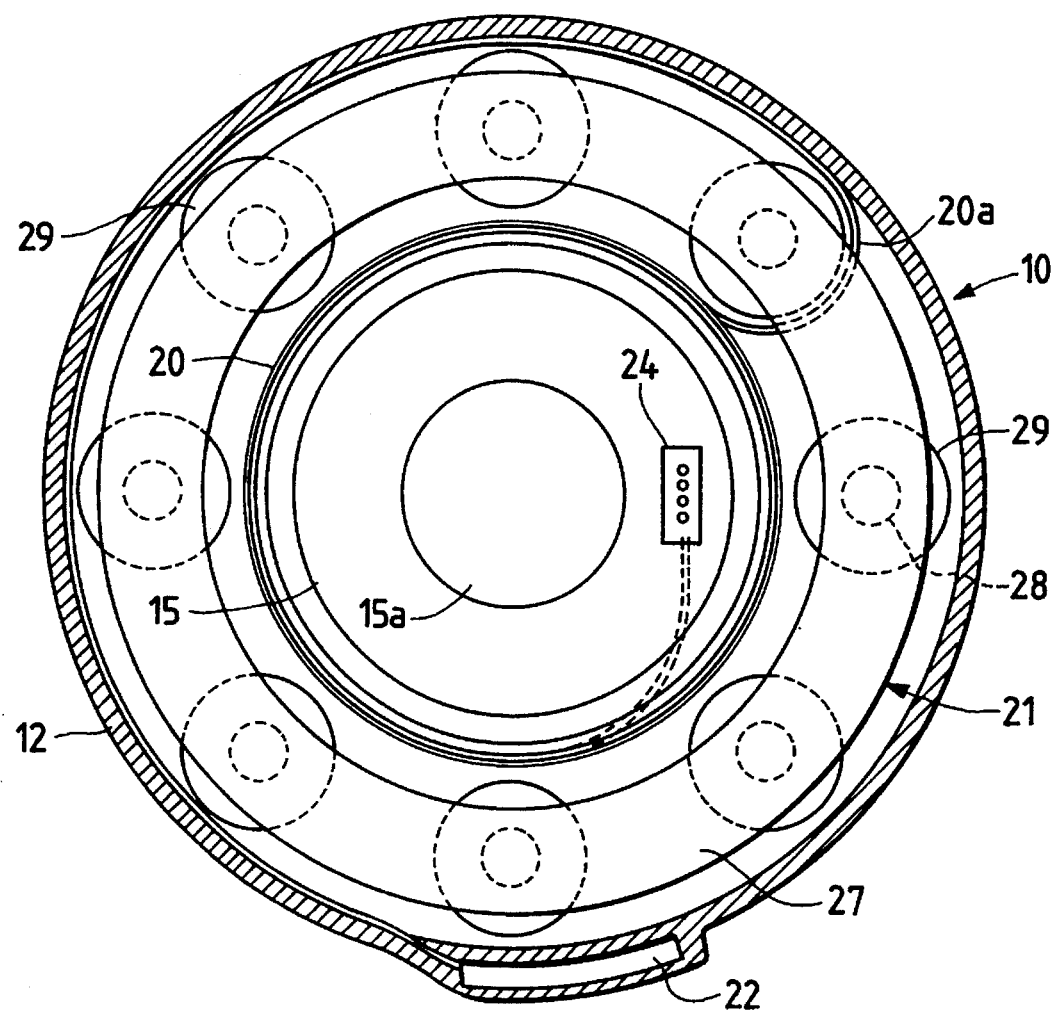
FIG. 3 is a plan view showing the clock spring connector shown in FIG. 1 in such a way that a ceiling plate is omitted from illustration.
Figure 4:
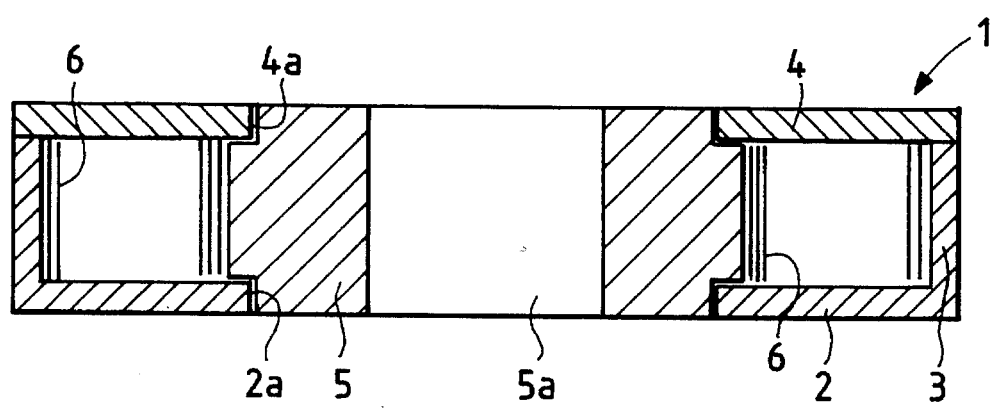
FIG. 4 is a cross sectional view showing a conventional clock spring connector.

FIG. 1 is a plan view showing a clock spring connector according to an embodiment of the present invention, FIG. 2 is a cross sectional view taken along line A—A of FIG. 1, and FIG. 3 is a plan view showing the clock spring connector from which a ceiling plate is omitted from illustration.

Referring to FIGS. 1 to 3, reference numeral 10 represents a fixed member. The fixed member 10 comprises a disc-like ceiling plate 11 having a central hole 11a, an outer cylinder portion 12 hung from the outer periphery of the ceiling plate 11, and a bottom plate 13 having a central hole 13a and formed integrally with the lower end of the outer cylinder portion 12. The ceiling plate 11 has an annular projection 14 formed on the outer periphery of the top surface thereof. In addition, a movable member 15 having a shaft-insertion hole 15a is rotatively disposed in the central portion of the fixed member 10. The two vertical ends of the movable member 15 are guided by the central holes 11a and 13a formed in the ceiling plate 11 and the bottom plate 13, respectively. A disc-like rotary plate 16 having a shaft-insertion hole 16a is placed on the top surface of the movable member 15. The movable member 15 and the rotary plate 16 are integrated by heat caulking performed such that a plurality of pins 15b protruding from the top surface of the movable member 15 are inserted into through holes formed in the rotary plate 16. A recess 17 slidably engaged to the projection 14 is formed on the periphery of the lower surface of the rotary plate 16. The rotary plate 16 has a holder 18 on the top surface thereof. The holder 18 is composed of a pair of protective walls 18a extending outwards from the shaft-insertion hole 16a and a support wall 18b extending upwards from the outer end of the protective walls 18a. The holder 18 serves as a portion for holding a lead wire to be described later. In addition, a pair of projections facing each other through the shaft-insertion hole 16a are protrude from the top surface of the rotary plate 16. The projections 19 are disposed adjacent to the outer periphery of the rotary plate 16 such that the projections 19 are at least located further from the center of rotation of the movable member than the movable member 15 in the radial direction of the rotary plate 16.

An annular space is formed between the outer cylinder portion 12 of the fixed member 10 and the outer surface of the movable member 15, the annular space accommodating a flexible cable 20 and a mover 21. The flexible cable 20 comprises a so-called flat cable formed by laminating a plurality of parallel conductive wires with a pair of insulating films. In this embodiment, a flat cable for four circuits formed by embedding four conductive lines is used. An end of the flexible cable 20 is connected to a first connector 22 secured to the outer cylinder portion 12, the flexible cable 20 being then connected in a lead wire 23 comprising a round cable in the first connector 22 so as to extend outside of the fixed member 10. On the other hand, another end of the flexible cable 20 is connected to a second connector 24 secured to the movable member 15. In the second connector 24, the flexible cable 20 is connected to a lead wire 25 comprising a round cable. The lead wire 25 is passed through a through hole formed adjacent to the shaft-insertion hole 16a formed in the rotary plate 16 and extends outside along the holder 18 so as to be secured to a support wall 18b of the holder by using a rubber band 26 or the like.

The mover 21 comprises an annular rotary ring 27, a plurality of support shafts 28 hung from the lower surface of the rotary ring 27 at predetermined intervals, and rollers 29 rotatively supported by the support shafts 28. The rotary ring 27 is slidably received by an annular guide groove 30 formed in the lower surface of the ceiling plate 11. As shown in FIG. 3, the flexible cable 20 is accommodated in the foregoing space in such a way that it is extended from the first connector 22, wound clockwise around the inner wall of the outer cylinder portion 12, and reversed in the form of a U-shape along one roller 29 (hereinafter called a "reversal portion 20a"), followed by being wound counterclockwise around the outer wall of the movable member 15 so as to reach the second connector 24.

The thus-constituted clock spring connector is mounted on a steering unit of an automobile. When the fixed member 10 is secured to the steering column portion in such a manner that the lead wire 23 protrudes outward from the fixed member 10 and is connected to an air bag drive circuit or a horn circuit mounted on the car body portion. The two projections 19 of the rotary plate 16 are inserted and secured in the hub holes formed in the steering wheel. Furthermore, a steering shaft is inserted into the shaft-insertion hole 15a of the movable member 15. The lead wire 25 protrudes outward from the movable member 15 and the rotary plate 16 is connected to an inflater for the air bag or a horn switch mounted on the steering wheel portion.

The operation of the clock spring connector according to this embodiment will now be described. When the steering wheel is rotated clockwise or counterclockwise, the rotational force is transmitted to the rotary plate 16 through the joint between the hub holes and the projections 19, the rotational force being then transmitted to the movable member 15 secured to the rotary plate 16. If the steering wheel is rotated clockwise causing the movable member 15 to rotate clockwise, the reversal portion 20a of the flexible cable 20 is moved clockwise by a quantity of rotation which is smaller than that of the movable member 15. Also the mover 21 including the group of the rollers 29 and the rotary ring 27 is moved clockwise so that the flexible cable 20 is moved away from the movable member 15 by a length which is about two times the quantity of movement of the mover 21 so as to be rewound around the outer cylinder portion 12. If the steering wheel is rotated counterclockwise shown in FIG. 3 causing the movable member 15 to be rotated counterclockwise, the reversal portion 20a of the flexible cable 20 and the mover 21 are moved counterclockwise by a quantity of rotation which is smaller than that of the movable member 15. As a result, the flexible cable 20 is moved away from the outer cylinder portion 12 by a length which is about two times the foregoing quantity of movement so as to be wound around the movable member 15. Since the projections 19 are disposed further from the center of rotation than the movable member 15 in the radial direction and the force transmission between the steering wheel and the rotary plate 16 is performed at a position sufficiently apart from the center of rotation of the movable member 15, the torque applied to the movable member 15 can be increased. Therefore, the operation for winding or rewinding the flexible cable 20 can be performed assuredly.

Since the foregoing embodiment has the arrangement that the force transmission between the steering wheel and the rotary plate 16 is performed at a position sufficiently apart from the center of rotation of the movable member 15 and the movable member 15 is rotated through the rotary plate 16, the torque of the movable member 15 can be enlarged. Thus, the rotational force of the movable member 15 is used to assuredly wind or rewind the flexible cable 20. Since the recess 17 of the rotary plate 16 is slidably received by the projection 14 of the ceiling plate 11, the outer surface of the rotary plate 16 is guided by the fixed member 10, the rotary plate 16 can be rotated smoothly. Furthermore, the adaptation to a different type steering unit comprising a hub hole disposed at a different position or having a different size can easily made by only changing the rotary plate 16. Therefore, the body of the clock spring connector except the rotary plate 16 can be standardized, thereby reducing the total cost of the clock spring connector. Moreover, the lead wire 25 protruding from the movable member 15 can be taken at a position near the outer periphery of the rotary plate 16 along the holder 18. Therefore, an operation of connecting the lead wire 25 to an inflater or the like mounted on the steering wheel required to mount the clock spring connector on a steering unit can be performed easily in a wide space outside the clock spring connector.

Although the foregoing embodiment comprises a means for transmitting the force between the steering wheel and the rotary plate is composed of the projections of the rotary plate to be inserted into hub holes, a converse arrangement may be employed in which projections of the steering wheel portion are inserted into holes formed in the rotary plate. Although the foregoing embodiment comprises the means for guiding the rotary plate to the fixed member 10 has the recess formed in the rotary plate to be slidably received by the projection stood erect on the ceiling plate, the relationship between the projection and the recess may, of course, be reversed.

As described above, according to the present invention, the force can be transmitted between steering wheel and the rotary plate at a position sufficiently apart from the center of rotation of the movable member and the movable member is rotated through the rotary plate. Therefore, the torque of the movable member can be enlarged and the rotational force of the movable member 15 can be used to assuredly wind or rewind the flexible cable.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A clock spring connector comprising:
    a fixed member including a cylinder portion connected to an outer edge of a ceiling plate having a first central hole, and connected to an outer edge of a bottom plate having a second central hole;
    a movable member rotatably received in said first and second central holes formed in said ceiling plate and said bottom plate, the movable member having a center of rotation;
    a flexible cable accommodated in a space formed between said fixed member and said movable member, said fixed member adapted for being secured to a steering column portion, and said movable member adapted for being connected to a steering wheel portion, said flexible cable including a portion extending through the movable member for connecting to the steering wheel portion, and
    a rotary plate rotatably mounted on a surface of said ceiling plate and fixedly secured to said movable member, the rotary plate including a support section for supporting the portion of flexible cable, the support section being located further from the center of rotation than an outer edge of the movable member.

2. A clock spring connector according to claim 1, wherein said fixed member and said rotary plate are provided with guide means for rotatively connecting said fixed member and said rotary plate to each other.

3. A clock spring connector according to claim 1, wherein the rotary plate includes a joint portion disposed further from the center of rotation in a radial direction than the central holes of the ceiling plate and the bottom plate so that rotational force of the steering wheel is transmitted to the rotary plate through the joint portion when the movable member is connected to the steering wheel portion.

4. A clock spring connector for electrically connecting an electronic device mounted on a steering wheel to an electronic system mounted on a steering column, the clock spring connector comprising:
    a fixed member including first and second parallel plates having outer edges connected to a cylinder portion and inner edges defining first and second central openings;
    a movable member rotatably connected to the first and second plates, the movable member having sides exposed through the first and second central openings, the movable member having a center of rotation;
    a flexible cable received in a space formed between the fixed member and the movable member, the flexible cable including a first end connected to the movable member and a second end connected to the fixed member; and
    a rotary plate fixedly connected to the movable member, the rotary plate including means for coupling the rotary plate to the steering wheel, the means for coupling being disposed further from the center of rotation in a radial direction than the edges of the first and second central openings.

5. A clock spring connector according to claim 4, wherein the means for connecting comprises a projection extending from the rotary plate.

6. A clock spring connector according to claim 4, wherein the means for connecting comprises a recess formed on the rotary plate for receiving a projection extending from the steering wheel.

7. A clock spring connector according to claim 4, wherein the rotary plate slidably contacts the first parallel plate.

8. A clock spring connector according to claim 7, wherein the rotary plate includes an annular rib and the first parallel plate includes an annular groove, the annular rib being received in the annular groove.

9. A clock spring connector according to claim 7, wherein the rotary plate includes an annular groove and the first parallel plate includes an annular rib, the annular rib being received in the annular groove.

* * * * *